United States Patent
Deng

(10) Patent No.: US 11,556,237 B2
(45) Date of Patent: Jan. 17, 2023

(54) PICTURE PRESENTATION METHOD AND DEVICE

(71) Applicants: Beijing Kingsoft Office Software, Inc., Beijing (CN); Zhuhai Kingsoft Office Software Co., Ltd., Guangdong (CN); Guangzhou Kingsoft Mobile Technology Co., Ltd., Guangzhou (CN)

(72) Inventor: Yingshan Deng, Guangdong (CN)

(73) Assignees: Beijing Kingsoft Office Software, Inc., Beijing (CN); Zhuhai Kingsoft Office Software Co., Ltd., Guangdong (CN); Guangzhou Kingsoft Mobile Technology Co., Ltd., Guangzhou (CN)

( * ) Notice: Subject to any disclaimer, the term of this patent is extended or adjusted under 35 U.S.C. 154(b) by 322 days.

(21) Appl. No.: 16/611,303

(22) PCT Filed: Apr. 19, 2018

(86) PCT No.: PCT/CN2018/083720
§ 371 (c)(1),
(2) Date: Nov. 6, 2019

(87) PCT Pub. No.: WO2018/205812
PCT Pub. Date: Nov. 15, 2018

(65) Prior Publication Data
US 2020/0167052 A1   May 28, 2020

(30) Foreign Application Priority Data
May 8, 2017 (CN) .......................... 201710323942.7

(51) Int. Cl.
*G06F 3/0486* (2013.01)

(52) U.S. Cl.
CPC .................................. *G06F 3/0486* (2013.01)

(58) Field of Classification Search
CPC ....................................................... G06F 3/0486
(Continued)

(56) References Cited

U.S. PATENT DOCUMENTS 9,116,648 B1    8/2015  Funderburg et al.
2009/0083614 A1*  3/2009  Wedekind ............... G06F 40/18
                                                    715/217
(Continued)

FOREIGN PATENT DOCUMENTS

CN    104112287 A    10/2014
CN    104598438 A     5/2015
(Continued)

OTHER PUBLICATIONS

EP18797581.8, May 25, 2020, Extended European Search Report.
(Continued)

*Primary Examiner* — Kyle R Stork
(74) *Attorney, Agent, or Firm* — Wolf, Greenfield & Sacks, P.C.

(57) ABSTRACT

A method and apparatus for displaying a picture including obtaining n columns of containers; obtaining a height of each column of containers, and taking a maximum value of the obtained heights as a first height; for each target column of containers, determining a height increment of each container in the target column of containers according to a difference between a height of the target column of containers and the first height, and adjusting an ordinate of each container and a height of each container in the target column of containers according to the height increment of each container in the target column of containers; for each column of containers, adjusting a width of each container in the column of containers according to a second height, a ratio of a height of the column of containers to the second height, a preset container gap, the number n of columns, and a width (Continued)

of a display interface; and displaying a corresponding picture in each container after the height, width, abscissa, and ordinate are adjusted. The method can produce beautiful display effects of pictures.

11 Claims, 2 Drawing Sheets

(58) Field of Classification Search
IPC .............................. G06F 40/174; G06Q 40/125
See application file for complete search history.

(56) References Cited

U.S. PATENT DOCUMENTS

| | | |
|---|---|---|
| 2010/0011316 A1 | 1/2010 | Sar et al. |
| 2013/0106913 A1 | 5/2013 | Edmiston et al. |
| 2014/0258849 A1* | 9/2014 | Chung .................. G06F 40/106 715/243 |
| 2016/0048605 A1 | 2/2016 | Baldwin et al. |

FOREIGN PATENT DOCUMENTS

| | | |
|---|---|---|
| CN | 104615400 A | 5/2015 |
| CN | 105787877 A | 7/2016 |
| CN | 105871945 A | 8/2016 |

OTHER PUBLICATIONS

Extended European Search Report dated May 25, 2020 in connection with EP18797581.8.
International Search Report and Written Opinion dated Jul. 19, 2018 in connection with PCT/CN2018/083720.

* cited by examiner

PICTURE PRESENTATION METHOD AND DEVICE

This Application is a national stage filing under 35 U.S.C. § 371 of International Patent Application Serial No. PCT/CN2018/083720, filed Apr. 19, 2018, which claims priority to Chinese patent application No. 201710323942.7 filed with the China National Intellectual Property Administration on May 8, 2017 and entitled "a method and apparatus for displaying a picture", the contents of these applications are incorporated herein by reference in their entirety.

TECHNICAL FIELD

The present application relates to the field of computer technology, and in particular to a method and apparatus for displaying a picture.

BACKGROUND

Before displaying multiple pictures of different sizes, it is necessary to determine the size of a container corresponding to each picture and the position of the container on a display interface, that is, the layout of the container on the display interface. In the prior art, the above layout is generally achieved in waterfall layout method. The waterfall layout method is a layout method in which containers for a plurality of pictures are arranged from top to bottom in a plurality of columns in a fixed area.

The existing waterfall layout method displays pictures after arranging the pictures in columns with equal width, and specifically includes: determining a target width of a container corresponding to each picture according to a width of a display interface, a preset number n of columns, and a preset container gap; determining, for each container, a target height of the container according to the target width and an aspect ratio of a picture corresponding to the container; dividing the containers into n groups such that a difference between the sum of target heights of containers in one group and the sum of target heights of containers in any of the other groups is minimized, which may be called a minimum value; placing containers in a same group into a same column to complete the layout; and finally displaying a corresponding picture in each container.

In the existing waterfall layout method, n groups correspond to n columns. The minimum differences among the sums of target heights of the n groups result in minimum height differences among the displayed columns. However, in general, the minimum difference is not "0", which means that there is a height difference between the displayed columns, as shown in FIG. 1, so that the displayed pictures are not regular, resulting in a problem of the poor display effect of the pictures.

SUMMARY

An objective of the embodiments of the present application is to provide a method and apparatus for displaying a picture, to achieve beautiful display effects of pictures. The specific technical solutions are as follows.

In a first aspect, a method for displaying a picture is provided by an embodiment of the present application. The method comprises:

obtaining n columns of containers, wherein n is a preset number of columns of containers, and original widths of containers in any one of the n columns of containers are equal;

obtaining a height of each column of containers, and taking a maximum value of the obtained heights as a first height;

for each target column of containers, determining a height increment of each container in the target column of containers according to a difference between a height of the target column of containers and the first height, and adjusting an ordinate of each container and a height of each container in the target column of containers according to the height increment of each container in the target column of containers, wherein the target column of containers is each column of containers in the n columns of containers other than a column of containers with the first height;

for each column of containers, adjusting a width of each container in the column of containers according to a second height, a ratio of a height of the column of containers to the second height, a preset container gap, the number n of columns, and a width of a display interface, wherein the second height is a sum of the heights of the n columns of containers;

adjusting abscissas of containers in each column of containers according to the preset container gap and the adjusted widths of containers in the columns of containers; and displaying a corresponding picture in each container after the height, width, abscissa, and ordinate are adjusted.

Optionally, for each target column of containers, determining a height increment of each container in the target column of containers according to a difference between a height of the target column of containers and the first height comprises:

determining a height increment Δy of each container in each target column of containers according to the following formula:

$$\Delta y = \frac{\Delta h}{m},$$

wherein, Δh is a difference between a height of a target column of containers and the first height, and m is the number of containers in the target column of containers.

Optionally, adjusting an ordinate of each container in the target column of containers according to the height increment of each container in the target column of containers comprises:

adjusting an ordinate of each target container in the column of containers according to the following formula:

y'=y+(p−1) Δy, wherein, y' is an adjusted ordinate of a target container, y is an ordinate of the target container before adjustment, Δy is a height increment of the target container, and p is a sequence number of the target container, in order from top to bottom, in a column of containers in which the target container is located.

Optionally, for each column of containers, adjusting a width of each container in the column of containers according to a second height, a ratio of a height of the column of containers to the second height, a preset container gap, the number n of columns, and a width of a display interface comprises:

adjusting a width of each container in each column of containers according to the following formula:

$$w = \left(1 - \frac{h}{h_a}\right) \times [W - (n-1)s],$$

wherein, w is an adjusted width of a container, h is a height of a column of containers in which the container is located, $h_a$ is the second height, W is the width of the display interface, and s is the preset container gap.

Optionally, adjusting abscissas of containers in each column of containers according to the preset container gap and the adjusted widths of containers in the columns of containers comprises:

adjusting an abscissa of each container according to the following formula:

$$x = (i-1)s + \sum_{c=1}^{i-1} w_c,$$

wherein, x is an adjusted abscissa of a container, i is a target sequence number of a column of containers in which the container is located, in order from left to right, in the n columns of containers, and $w_c$ is a width of a container in a column of containers with a sequence number c.

Optionally, displaying a corresponding picture in each container after the height, width, abscissa, and ordinate are adjusted comprises:

adjusting a picture corresponding to each container and displaying the adjusted picture in the container by operations of:

calculating an adjusted height of a target picture corresponding to a reference container according to a height of the target picture and a first scaling ratio, wherein the first scaling ratio is a ratio of a width of the target picture to a width of the reference container, and the reference container is any container;

determining whether the adjusted height is greater than the height of the reference container;

if the adjusted height is greater than the height of the reference container, adjusting the width of the target picture to the width of the reference container, adjusting a height of the target picture to the adjusted height, and displaying the adjusted target picture in the reference container; and if the adjusted height is not greater than the height of the reference container, adjusting the height of the target picture to the height of the reference container, calculating an adjusted width of the target picture according to the width of the target picture and a second scaling ratio, adjusting the width of the target picture to the adjusted width and displaying the adjusted target picture in the reference container, wherein the second scaling ratio is a ratio of the height of the target picture to the height of the reference container.

Optionally, after obtaining the height of each column of containers, the method further comprises:

determining whether the heights of the n columns of containers fluctuate within a preset range, and if the heights of the n columns of containers fluctuate within a preset range, performing the step of taking a maximum value of the obtained heights as a first height.

In a second aspect, an apparatus for displaying a picture is provided by an embodiment of the present application. The apparatus comprises:

a first obtaining module, configured for obtaining n columns of containers, wherein n is a preset number of columns of containers, and original widths of containers in any one of the n columns of containers are equal;

a second obtaining module, configured for obtaining a height of each column of containers, and taking a maximum value of the obtained heights as a first height;

a first adjusting module, configured for determining, for each target column of containers, a height increment of each container in the target column of containers according to a difference between a height of the target column of containers and the first height, and adjusting an ordinate of each container and a height of each container in the target column of containers according to the height increment of each container in the target column of containers, wherein the target column of containers is each column of containers in the n columns of containers other than a column of containers with the first height;

a second adjusting module, configured for adjusting, for each column of containers, a width of each container in the column of containers according to a second height, a ratio of a height of the column of containers to the second height, a preset container gap, the number n of columns, and a width of a display interface, wherein the second height is a sum of the heights of the n columns of containers;

a third adjusting module, configured for adjusting abscissas of containers in each column of containers according to the preset container gap and the adjusted widths of containers in the columns of containers; and a display module, configured for displaying a corresponding picture in each container after the height, width, abscissa, and ordinate are adjusted.

Optionally, the first adjusting module is further configured for:

determining a height increment $\Delta y$ of each container in each target column of containers according to the following formula:

$$\Delta y = \frac{\Delta h}{m},$$

wherein, $\Delta h$ is a difference between a height of a target column of containers and the first height, and m is the number of containers in the target column of containers.

Optionally, the first adjusting module is further configured for:

adjusting an ordinate of each target container in the column of containers according to the following formula:

y'=y+(p−1) $\Delta y$, wherein, y' is an adjusted ordinate of a target container, y is an ordinate of the target container before adjustment, $\Delta y$ is a height increment of the target container, and p is a sequence number of the target container, in order from top to bottom, in a column of containers in which the target container is located.

Optionally, the second adjusting module is further configured for:

adjusting a width of each container in each column of containers according to the following formula:

$$w = \left(1 - \frac{h}{h_a}\right) \times [W - (n-1)s],$$

wherein, w is an adjusted width of a container, h is a height of a column of containers in which the container is located, $h_a$ is the second height, W is the width of the display interface, and s is the preset container gap.

Optionally, the third adjusting module is further configured for:

adjusting an abscissa of each container according to the following formula:

$$x = (i-1)s + \sum_{c=1}^{i-1} w_c,$$

wherein, x is an adjusted abscissa of a container, i is a target sequence number of a column of containers in which the container is located, in order from left to right, in the n columns of containers, and $w_c$ is a width of a container in a column of containers with a sequence number c.

Optionally, the display module comprises a calculating submodule, a determining submodule, a first adjusting submodule, and a second adjusting submodule;

the display module is further configured for adjusting, by the calculating submodule, the determining submodule, the first adjusting submodule and the second adjusting submodule, a picture corresponding to each container, and displaying the adjusted picture in the container;

the calculating submodule is configured for calculating an adjusted height of a target picture corresponding to a reference container according to a height of the target picture and a first scaling ratio, wherein the first scaling ratio is a ratio of a width of the target picture to a width of the reference container, and the reference container is any container;

the determining submodule is configured for determining whether the adjusted height is greater than the height of the reference container; if the adjusted height is greater than the height of the reference container, triggering the first adjusting submodule; if the adjusted height is not greater than the height of the reference container, triggering the second adjusting submodule;

the first adjusting submodule is configured for adjusting the width of the target picture to the width of the reference container, adjusting a height of the target picture to the adjusted height, and displaying the adjusted target picture in the reference container; and the second adjusting submodule is configured for adjusting the height of the target picture to the height of the reference container, calculating an adjusted width of the target picture according to the width of the target picture and a second scaling ratio, adjusting the width of the target picture to the adjusted width and displaying the adjusted target picture in the reference container, wherein the second scaling ratio is a ratio of the height of the target picture to the height of the reference container.

Optionally, the apparatus further includes:

a determining module, configured for determining whether the heights of the n columns of containers fluctuate within a preset range, and if the heights of the n columns of containers fluctuate within a preset range, triggering the second obtaining module.

In a third aspect, an electronic device is provided by an embodiment of the present application. The electronic device comprises a processor, a communication interface, a memory, and a communication bus, wherein the processor, the communication interface, and the memory communicate with each other through the communication bus.

The memory is configured to store a computer program.

The processor is configured to implement any one of the methods for displaying a picture provided by the embodiments of the present application when executing the computer program stored on the memory.

In a fourth aspect, a computer readable storage medium is provided by an embodiment of the present application. The computer readable storage medium stores a computer program, and the computer program, when executed by a processor, implements any one of the methods for displaying a picture provided by the embodiments of the present application.

In a fifth aspect, a computer program is provided by an embodiment of the present application. The computer program, when being executed by a processor, implements any one of the methods for displaying a picture provided by the embodiments of the present application.

In a method and apparatus for displaying a picture provided by the embodiments of the present application, each column of containers in the n columns of containers with unequal heights is adjusted to a first height, such that the heights of the columns of containers are equal. In this way, the regularity of the arrangement of the n columns of containers is higher than that of the arrangement of containers in prior art, so that pictures are displayed more regularly, thereby producing the beautiful display effect of the pictures.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION OF THE INVENTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

Embodiments of the present application disclose a method and apparatus for displaying a picture, which will be described hereinafter in detail.

A method for displaying a picture according to an embodiment of the present application may be applied to an electronic device, which may be a laptop, a tablet computer, a desktop computer, a smart phone, or the like. Specifically, the method for displaying a picture provided by the embodiment of the present application is applied to a client software running on an electronic device, and the software may be a dedicated picture browser. Further, the method may also be applied to a function plug-in of the client software, for example, a function plug-in of a web browser, a function plug-in of a camera, a function plug-in of a picture processor, and the like.

Figure 2:
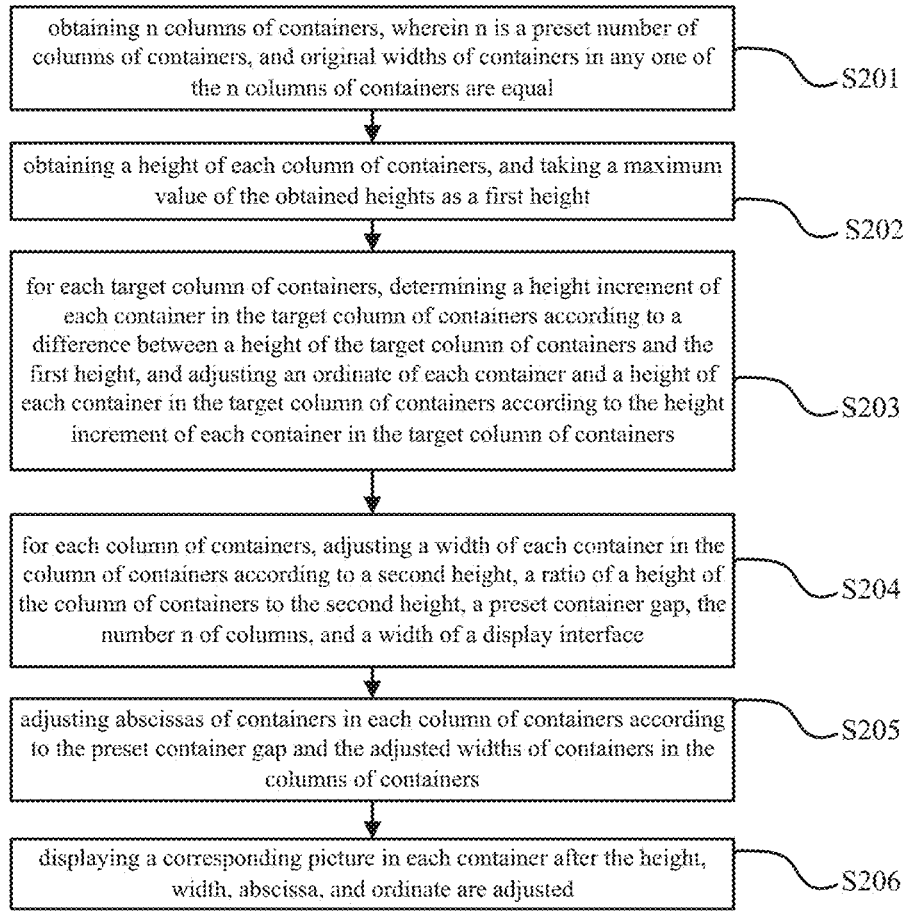
FIG. 2 is a flowchart of a method for display a picture according to an embodiment of the present application.

As shown in FIG. 2, the method for displaying a picture provided by an embodiment of the present application includes S201-S206.

S201: obtaining n columns of containers, wherein n is a preset number of columns of containers, and original widths of containers in any one of the n columns of containers are equal.

The heights of the n columns of containers may not be equal. In order to display the pictures corresponding to the containers more regularly, it is necessary to adjust the height of each container column. Therefore, the n columns of containers are obtained for adjustment. A container column is any one of the n columns of containers. In the embodiment of the present application, the number n of columns is not limited. For example, n may be 2, 3, 4, or the like. The container in the embodiment of the present application is a component for displaying a picture.

In one implementation, the obtained n columns of containers may be generated by means of waterfall layout with columns of equal width, and may be generated in other manners, which is not specifically limited in the embodiment of the present application.

It should be noted that the original widths of the containers in any one column of the obtained n columns of containers are equal, that is, the widths of containers in the same column of containers are equal. The widths of containers in different columns of containers may be equal or not equal, which is not limited in the embodiment of the present application.

Optionally, when the widths of containers in different columns of containers are equal, the width of each column may be $w_e$:

$$w_e = \frac{W - (n-1)s}{n},$$

wherein W is the width of a display interface, and s is a preset container gap. Accordingly, when the widths of containers of the n columns of containers are equal, the height of each container may be $h_e$:

$$h_e = w_e \times \frac{h_p}{w_p},$$

wherein $h_p$ is the height of a picture corresponding to the container, and $w_p$ is the width of the picture corresponding to the container.

Optionally, in generating the n columns of containers, a container included in each of the n columns of containers may be determined by grouping containers via dynamic programming, such that the difference between the sum of heights of containers in each group and the sum of heights of containers in any one of other groups is smallest, and determining containers in the same group as containers in the same column. Preferably, in order to simplify the generation of the n columns of containers, a container for which a column is not determined can also be inserted into a column of containers with the smallest column height, to determine containers included in each column.

In an implementation, the process of obtaining the n columns of containers may include: dividing multiple containers into N columns by means of dynamic programming grouping. Specifically, the principle behind dividing multiple containers into N columns is to minimize the difference between the sum of heights of containers included in each column and the sum of heights of containers included in any one of other columns. In another implementation, in order to simplify the process of obtaining the n columns of containers, the process of obtaining the n columns of containers may include: inserting a container for which a column is not determined into a current column with the smallest column height, so as to determine containers included in each column. For example, it is necessary to determine a column to which a container A belongs. The current height of a container column 1 is 19.00 cm, the current height of a container column 2 is 18.91 cm, the current height of a container column 3 is 19.11 cm, and the current height of a container column 4 is 18.32 cm. At this time, the height of the container column 4 is smallest, and thus the container A is inserted into the container column 4. At present, it is necessary to determine a column to which a container B belongs. The current height of the container column 1 is 19.00 cm, the current height of the container column 2 is 18.91 cm, the current height of the container column 3 is 19.11 cm, and the current height of the container column 4 is 19.90 cm. At this time, the height of the container column 2 is smallest, and thus the container B is inserted into the container column 2, and so on, until all the containers to be inserted into the container columns are inserted into respective container columns.

S202: obtaining a height of each column of containers, and taking a maximum value of the obtained heights as a first height.

After the n columns of containers are obtained, the heights of the columns of containers are calculated and compared to obtain the highest height.

Specifically, the height of each column of containers may be the sum of the heights of all the containers in the column of containers and the gap between every two adjacent containers in the column of containers. Therefore, the height of each column of containers can be obtained based on the heights of the containers included in this column of containers and the preset container gap.

In an alternative implementation, a container is generally a regular rectangular shape, so the height of a column of containers can be obtained by calculating the difference between the upper left ordinate of the topmost container in the column of containers and the lower left ordinate of the lowest container in the column of containers.

Optionally, the heights of the columns of the containers can be compared. The highest height is selected as the first height, thereby obtaining the first height, that is, the height of the highest column of containers.

S203: for each target column of containers, determining a height increment of each container in the target column of containers according to a difference between a height of the target column of containers and the first height, and adjusting an ordinate of each container and a height of each container in the target column of containers according to the height increment of each container in the target column of containers, wherein the target column of containers is each column of containers in the n columns of containers other than a column of containers with the first height.

After the first height is obtained, the heights of the remaining columns of containers need to be adjusted to the first height. Therefore, it is necessary to calculate the difference between the height of each column of containers and the first height to obtain an adjustment value of each column of containers, so as to obtain a height increment of each container in the column of containers.

For one column of containers, height increments of different containers in the column of containers may be equal or may not be equal, which is described in detail below.

In case the height increments of containers in the same column of containers are equal, optionally, a height increment $\Delta y$ of each container in each target column of containers is determined according to the following formula:

$$\Delta y = \frac{\Delta h}{m},$$

wherein, $\Delta h$ is a difference between a height of a target column of containers and the first height, and $m$ is the number of containers in the target column of containers.

In case the height increments of containers in the same column of containers are not equal, optionally, a height increment of each container is calculated according to $\Delta h$ and the ratio of the height of this container to the sum of the heights of all the containers in a column of containers in which this container is located.

After the height increments are obtained, the height of each container is increased according to the height increment corresponding to the container.

Since the heights of the containers have changed, it is necessary to adjust the ordinate of each container. In an alternative embodiment, the height change of each container in the same column of containers is equal. Thus, according to height increments of each column of containers, an ordinate of each container in the column is adjusted. Optionally, an ordinate of each target container in the column of containers is adjusted according to the following formula: $y'=y+(p-1)\Delta y$, wherein, $y'$ is an adjusted ordinate of a target container, $y$ is an ordinate of the target container before adjustment, $\Delta y$ is a height increment of the target container, and $p$ is a sequence number of the target container, in order from top to bottom, in a column of containers in which the target container is located.

Optionally, an ordinate of a container may be adjusted by first adjusting an ordinate of a reference point of the container, and then adjusting ordinates of other points of the container. In the embodiment of the present application, the reference point may be any point of the container, for example, the upper left vertex of the container.

S204: for each column of containers, adjusting a width of each container in the column of containers according to a second height, a ratio of a height of the column of containers to the second height, a preset container gap, the number n of columns, and a width of a display interface, wherein the second height is a sum of heights of the n columns of containers.

After the height of each container that needs to be adjusted in height is increased, it is necessary to adjust the width of the container. In order to improve the regularity of the container, the widths of the containers in the same column of containers are adjusted to the same value. Due to the limited total width of the display interface, the widths of containers whose heights are increased cannot be increased by a corresponding value. Therefore, the adjusted width of each column of containers is determined according to the ratio of the height of each column of containers to the total height of the n columns of containers, and the adjusted width of a column of containers with a smaller height is a larger value.

That is to say, the height of each container that needs to be adjusted in height is adjusted. In other words, after the height of each container is increased, the width of the container also needs to be adjusted. In order to improve the regularity of the container, the widths of the containers in the same column of containers can be adjusted to the same value, that is, the adjusted widths of containers in the same column of containers are equal. In addition, due to the limited total width of the display interface, when the width of a container whose height is increased is adjusted, the width of the container cannot may be increased by a corresponding value. The increasing of the width of the container by a corresponding value may include: determining an increment of the container based on the height increment of the container and a ratio between the width and height of the container. In one case, the adjusted width of each column of containers can be determined based on the ratio of the height of each column of containers to the total height of the n columns of containers. It can be understood that for a column of containers whose height is adjusted, the heights of the containers included in the column of containers are all adjusted, that is, the heights are increased. In order to ensure the regularity of the containers, after the height of a container is increased, the width of the container also needs to be increased, that is, the width of a column of containers whose height is adjusted needs to be adjusted. At this time, due to the limited total width of the display interface, after the width of each column of containers is adjusted based on the method for displaying a picture provided by the embodiment of the present application, the adjusted width of a column of containers that has a smaller height before adjustment may be a larger value, that is, the adjusted width of this column of containers is larger than the adjusted width of a column of containers that has a height higher than this column of containers before adjustment.

Specifically, the width of each container in each column of containers may be adjusted according to the following formula:

$$w = \left(1 - \frac{h}{h_a}\right) \times [W - (n-1)s],$$

wherein, $w$ is the adjusted width of a container, $h$ is the height of a column of containers in which the container is located, $h_a$ is the second height, $W$ is the width of the display interface, and $s$ is the preset container gap.

S205: adjusting abscissas of containers in each column of containers according to the preset container gap and the adjusted widths of containers in the columns of containers.

Since the widths of containers in each column of containers have changed, it is necessary to adjust the abscissa of each container in each column of containers.

In an alternative implementation, according to an adjusted container width corresponding to a column of containers on the left of a currently adjusted column of containers, the abscissa of each container in the currently adjusted column of containers is determined.

Specifically, the abscissa of each container is adjusted according to the following formula:

$$x = (i-1)s + \sum_{c=1}^{i-1} w_c,$$

wherein, x is the adjusted abscissa of a container, i is a target sequence number of a column of containers that the container is located, in order from left to right, in the n columns of containers, and $w_c$ is a width of a container in a column of containers with a sequence number c.

In an alternative embodiment, the abscissa of the container may be adjusted by first adjusting the abscissa of a reference point of the container and then adjusting the abscissas of other points of the container. Alternatively, the reference point of the container can be any point of the container, for example, the upper left vertex.

S206: displaying a corresponding picture in each container after the height, width, abscissa, and ordinate are adjusted.

After the width and height of a container are adjusted and the position of the container is determined, the picture corresponding to the container is displayed.

Since the width and height of the container are changed, the width and height of the picture corresponding to the container may be adjusted, so as to make the size of the picture close to the size of the adjusted container.

Optionally, a picture is adjusted by operations of:

calculating an adjusted height of a target picture corresponding to a reference container according to a height of the target picture and a first scaling ratio, wherein the first scaling ratio is a ratio of a width of the target picture to a width of the reference container, and the reference container is any container;

determining whether the adjusted height calculated is greater than the height of the reference container;

if the adjusted height calculated is greater than the height of the reference container, adjusting the width of the target picture to the width of the reference container, adjusting the height of the target picture to the adjusted height calculated, and displaying the adjusted target picture in the reference container; and if the adjusted height calculated is not greater than the height of the reference container, adjusting the height of the target picture to the height of the reference container, calculating an adjusted width of the target picture according to the width of the target picture and a second scaling ratio, adjusting the width of the target picture to the adjusted width calculated and displaying the adjusted target picture in the reference container, wherein the second scaling ratio is a ratio of the height of the target picture to the height of the reference container.

Optionally, the adjusted height a' of the target picture may be calculated by the following formula:

$$a' = a \div \frac{b}{m},$$

wherein, $\frac{b}{m}$ is the first scaling ratio, b is the width of the target picture, m is the width of the container corresponding to the target picture, and a is the height of the target picture.

Optionally, the adjusted width b' of the target picture may be calculated by the following formula:

$$b' = b \div \frac{a}{n},$$

wherein n is the height of the container corresponding to the target picture.

In the method for displaying a picture provided by the embodiments of the present application, each column of containers in the n columns of containers of unequal height is adjusted to a first height, such that the heights of the columns of containers are equal. In this way, the regularity of the arrangement of the n columns of containers is higher than that of the arrangement of containers in prior art, which allows the pictures to be displayed more regularly, thereby producing a beautiful display effect of the pictures.

It can be understood that height increments of containers in each column of containers mainly depend on the difference between the height of this column of containers and the height of the highest column of containers. When the difference is large, the height increment of each container in the column of containers is relatively large. On the contrary, the height increment of each container is relatively small. In order to make the height increment of each container meet a preset condition, the embodiment of the present application further includes:

determining whether the heights of the n columns of containers fluctuate within a preset range, and if yes, performing the step of taking the maximum value of the obtained heights as the first height.

Optionally, the preset range can be set to a small value. When the heights of the n columns of containers fluctuate within a small range, the difference between the height of each column of containers and the height of the highest column of containers may be in a small range, so that each container has a smaller height increment, which helps to ensure the regularity of the displayed pictures, and makes the adjusted width and height of the containers close to the sizes of the pictures.

In one implementation, the preset range may be set to be a small value, that is, the heights of the n columns of containers are limited to fluctuate within a small range. When the heights of the n columns of containers fluctuate within a small range, the difference between the height of each column of containers and the height of the highest column of containers may be in a small range, so that each container has a smaller height increment, which helps to ensure the regularity of the displayed pictures, and makes the adjusted width and height of the containers close to the sizes of the pictures.

In order to explain the method for displaying a picture according to the embodiment of the present application more clearly, the following detailed description will be given by way of examples.

Figure 1:
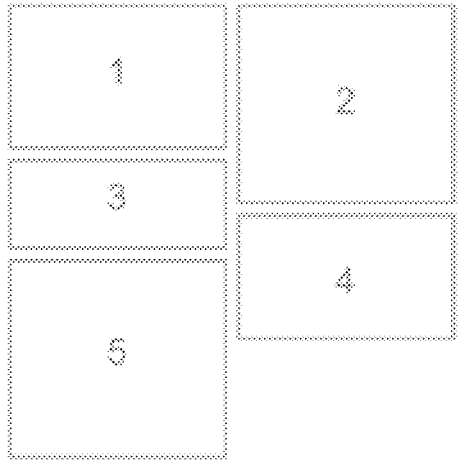
FIG. 1 is a diagram showing the effect of a waterfall layout according to a principle that columns have an equal width.
Figure 3:
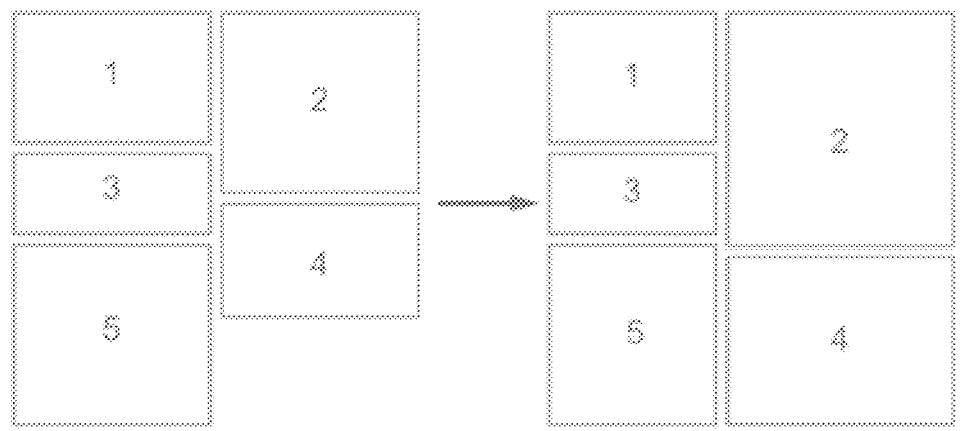
FIG. 3 is a comparison diagram of a display effect of the prior art and a display effect of a method for displaying an picture according to an embodiment of the present application.

For example, two container columns of equal width as shown in FIG. 1 are obtained. Numbers 1-5 in FIG. 1 represent five containers respectively. A container 1, a container 3, and a container 5 constitute a column of containers A, and a container 2 and a container 4 constitute another column of containers B. It can be known through calculation that the column of containers A is the highest column in the two columns, therefore the height of the column of containers B needs to be adjusted to the height of the column of containers A. Specifically, a height difference between the two columns A and B is calculated, and the difference is divided by the number of containers in the column B, that is, divided by 2. Thus, height increments of the container 2 and the container 4 are obtained, and the heights of the container 2 and container 4 are increased by the corresponding height increments. As the height of the container 2 increases, an ordinate of a reference point of the container 4 is increased. Since the heights of the containers in the column B are increased, it is necessary to adjust the widths of the containers in the two columns, so as to ensure the minimal change in the aspect ratio of the containers in the column B. Specifically, the sum of the heights of the two columns A and B is calculated, and the ratios of the heights of the two columns A and B to the sum of the heights are respectively obtained. Then, two widths are obtained by multiplying the above two ratios by a value obtained by a display width minus a container gap. It can be understood that one of the widths is smaller than the current width and the other width is larger than the current width. Since the heights of the containers in the column B are increased, the widths of the containers in the column B are adjusted to a width greater than the current width, and the widths of the containers in the column A are adjusted to a width smaller than the current width. Then, as the widths of the containers in the column A are changed, it is necessary to adjust the abscissas of the containers in the column B. Specifically, the adjusted width of container of the column A can be added to the container gap to obtain the abscissas of the container 2 and container 4 in the column B. Finally, corresponding pictures are displayed in the adjusted containers, as shown in FIG. 3.

Figure 4:
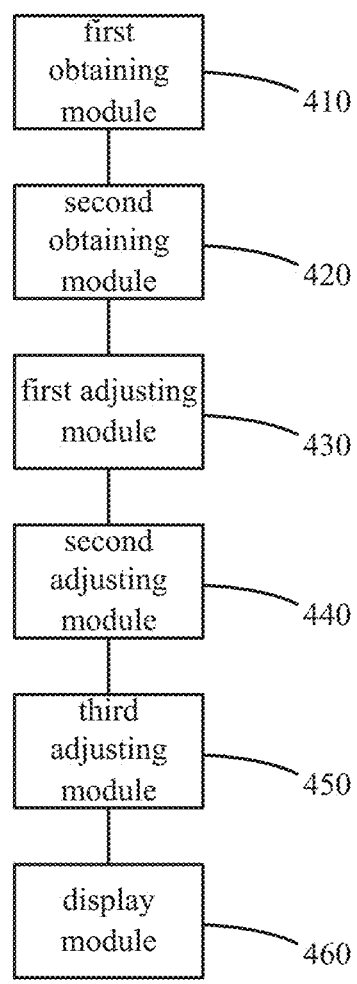
FIG. 4 is a schematic structural diagram of an apparatus for displaying a picture according to an embodiment of the present application.

Corresponding to the foregoing method embodiment, as shown in FIG. 4, an embodiment of the present application further provides an apparatus for displaying a picture. The apparatus includes:

a first obtaining module 410, configured for obtaining n columns of containers, wherein n is a preset number of columns of containers, and original widths of containers in any one of the n columns of containers are equal;

a second obtaining module 420, configured for obtaining a height of each column of containers, and taking a maximum value of the obtained heights as a first height;

a first adjusting module 430, configured for determining, for each target column of containers, a height increment of each container in the target column of containers according to a difference between a height of the target column of containers and the first height, and adjusting an ordinate of each container and a height of each container in the target column of containers according to the height increment of each container in the target column of containers, wherein the target column of containers is each column of containers in the n columns of containers other than a column of containers with the first height;

a second adjusting module 440, configured for adjusting, for each column of containers, a width of each container in the column of containers according to a second height, a ratio of a height of the column of containers to the second height, a preset container gap, the number n of columns, and a width of a display interface, wherein the second height is a sum of the heights of the n columns of containers;

a third adjusting module 450, configured for adjusting abscissas of containers in each column of containers according to the preset container gap and the adjusted widths of containers in the columns of containers; and a display module 460, configured for displaying a corresponding picture in each container after the height, width, abscissa, and ordinate are adjusted.

The apparatus for displaying a picture provided by the embodiment of the present application adjusts each column of containers in the n columns of containers with unequal heights to a first height, such that the heights of the columns of containers are equal. In this way, the regularity of the arrangement of the n columns of containers is higher than that of the arrangement of containers in prior art, which allows pictures to be displayed more regularly, thereby producing the beautiful display effect of the pictures.

Optionally, the first adjusting module 430 is further configured for:

determining a height increment $\Delta y$ of each container in each target column of containers according to the following formula:

$$\Delta y = \frac{\Delta h}{m},$$

wherein, $\Delta h$ is a difference between a height of a target column of containers and the first height, and m is the number of containers in the target column of containers.

Optionally, the first adjusting module 430 is further configured for:

adjusting an ordinate of each target container in the column of containers according to the following formula:

$y'=y+(p-1) \Delta y$, wherein, $y'$ is an adjusted ordinate of a target container, y is an ordinate of the target container before adjustment, $\Delta y$ is a height increment of the target container, and p is a sequence number of the target container, in order from top to bottom, in a column of containers in which the target container is located.

Optionally, the second adjusting module 440 is further configured for:

adjusting a width of each container in each column of containers according to the following formula:

$$w = \left(1 - \frac{h}{h_a}\right) \times [W - (n-1)s],$$

wherein, w is an adjusted width of a container, h is a height of a column of containers in which the container is located, $h_a$ is the second height, W is the width of the display interface, and s is the preset container gap.

Optionally, the third adjusting module 450 is further configured for:

adjusting an abscissa of each container according to the following formula:

$$x = (i-1)s + \sum_{c=1}^{i-1} w_c,$$

wherein, x is an adjusted abscissa of a container, i is a target sequence number of a column of containers in which the container is located, in order from left to right, in the n columns of containers, and $w_c$ is a width of a container in a column of containers with a sequence number c.

Optionally, the display module 460 comprises a calculating submodule, a determining submodule, a first adjusting submodule, and a second adjusting submodule.

The display module is further configured for adjusting, by the calculating submodule, the determining submodule, the first adjusting submodule and the second adjusting submodule, a picture corresponding to each container, and displaying the adjusted picture in the container.

The calculating submodule is configured for calculating an adjusted height of a target picture corresponding to a reference container according to a height of the target picture and a first scaling ratio, wherein the first scaling ratio is a ratio of a width of the target picture to a width of the reference container, and the reference container is any container.

The determining submodule is configured for determining whether the adjusted height is greater than the height of the reference container; if the adjusted height is greater than the height of the reference container, triggering the first adjusting submodule; if the adjusted height is not greater than the height of the reference container, triggering the second adjusting submodule.

The first adjusting submodule is configured for adjusting the width of the target picture to the width of the reference container, adjusting a height of the target picture to the adjusted height, and displaying the adjusted target picture in the reference container.

The second adjusting submodule is configured for adjusting the height of the target picture to the height of the reference container, calculating an adjusted width of the target picture according to the width of the target picture and a second scaling ratio, adjusting the width of the target picture to the adjusted width and displaying the adjusted target picture in the reference container, wherein the second scaling ratio is a ratio of the height of the target picture to the height of the reference container.

Optionally, the apparatus further includes:

a determining module, configured for determining whether the heights of the n columns of containers fluctuate within a preset range, and if the heights of the n columns of containers fluctuate within the preset range, triggering the second obtaining module 420.

Corresponding to the above method embodiments, an embodiment of the present application further provides an electronic device, including a processor, a communication interface, a memory, and a communication bus. The processor, the communication interface, and the memory communicate with each other through the communication bus.

The memory is configured to store a computer program.

The processor is configured to implement any one of the methods for displaying a picture provided by the embodiments of the present application when executing the computer program stored in the memory. The method for displaying a picture may include the following steps:

obtaining n columns of containers, wherein n is a preset number of columns of containers, and original widths of containers in any one of the n columns of containers are equal;

obtaining a height of each column of containers, and taking a maximum value of the obtained heights as a first height;

for each target column of containers, determining a height increment of each container in the target column of containers according to a difference between a height of the target column of containers and the first height, and adjusting an ordinate of each container and a height of each container in the target column of containers according to the height increment of each container in the target column of containers, wherein the target column of containers is each column of containers in the n columns of containers other than a column of containers with the first height;

for each column of containers, adjusting a width of each container in the column of containers according to a second height, a ratio of a height of the column of containers to the second height, a preset container gap, the number n of columns, and a width of a display interface, wherein the second height is a sum of the heights of the n columns of containers;

adjusting abscissas of containers in each column of containers according to the preset container gap and the adjusted widths of containers in the columns of containers; and displaying a corresponding picture in each container after the height, width, abscissa, and ordinate are adjusted.

In the embodiment of the present application, each column of containers in the n columns of containers with unequal heights is adjusted to a first height, such that the heights of the columns of containers are equal. In this way, the regularity of the arrangement of the n columns of containers is higher than that of the arrangement of containers in prior art, which allows pictures to be displayed more regularly, thereby producing the beautiful display effect of the pictures.

In an implementation, for each target column of containers, determining a height increment of each container in the target column of containers according to a difference between a height of the target column of containers and the first height comprises:

determining a height increment $\Delta y$ of each container in each target column of containers according to the following formula:

$$\Delta y = \frac{\Delta h}{m},$$

wherein, $\Delta h$ is a difference between a height of a target column of containers and the first height, and m is the number of containers in the target column of containers.

In an implementation, adjusting an ordinate of each container in the target column of containers according to the height increment of each container in the target column of containers comprises:

adjusting an ordinate of each target container in the column of containers according to the following formula:

$y'=y+(p-1) \Delta y$, wherein, $y'$ is an adjusted ordinate of a target container, y is an ordinate of the target container before adjustment, $\Delta y$ is a height increment of the target container, and p is a sequence number of the target container, in order from top to bottom, in a column of containers in which the target container is located.

In an implementation, for each column of containers, adjusting a width of each container in the column of containers according to a second height, a ratio of a height of the column of containers to the second height, a preset container gap, the number n of columns, and a width of a display interface comprises:

adjusting a width of each container in each column of containers according to the following formula:

$$w = \left(1 - \frac{h}{h_a}\right) \times [W - (n-1)s],$$

wherein, w is an adjusted width of a container, h is a height of a column of containers in which the container is located, $h_a$ is the second height, W is the width of the display interface, and s is the preset container gap.

In an implementation, adjusting abscissas of containers in each column of containers according to the preset container gap and the adjusted widths of containers in the columns of containers comprises:

adjusting an abscissa of each container according to the following formula:

$$x = (i-1)s + \sum_{c=1}^{i-1} w_c,$$

wherein, x is an adjusted abscissa of a container, i is a target sequence number of a column of containers in which the container is located, in order from left to right, in the n columns of containers, and $w_c$ is a width of a container in a column of containers with a sequence number c.

In an implementation, displaying a corresponding picture in each container after the height, width, abscissa, and ordinate are adjusted comprises:

adjusting a picture corresponding to each container and displaying the adjusted picture in the container by operations of:

calculating an adjusted height of a target picture corresponding to a reference container according to a height of the target picture and a first scaling ratio, wherein the first scaling ratio is a ratio of a width of the target picture to a width of the reference container, and the reference container is any container;

determining whether the adjusted height is greater than the height of the reference container;

if the adjusted height is greater than the height of the reference container, adjusting the width of the target picture to the width of the reference container, adjusting a height of the target picture to the adjusted height, and displaying the adjusted target picture in the reference container;

if the adjusted height is not greater than the height of the reference container, adjusting the height of the target picture to the height of the reference container, calculating an adjusted width of the target picture according to the width of the target picture and a second scaling ratio, adjusting the width of the target picture to the adjusted width and displaying the adjusted target picture in the reference container, wherein the second scaling ratio is a ratio of the height of the target picture to the height of the reference container.

In an implementation, after obtaining the height of each column of containers, the method further comprises:

determining whether the heights of the n columns of containers fluctuate within a preset range, and if the heights of the n columns of containers fluctuate within the preset range, performing the step of taking a maximum value of the obtained heights as a first height.

The communication bus mentioned in the above electronic device may be a Peripheral Component Interconnect (PCI) bus or an Extended Industry Standard Architecture (EISA) bus. The communication bus may be divided into an address bus, a data bus, a control bus, and the like. For the convenience of representation, only one thick line is shown in the figures, but it does not mean that there is only one bus or one type of bus.

The communication interface is used for communication between the above electronic device and other devices.

The memory may include a random access memory (RAM), and may also include a non-volatile memory (NVM), such as at least one disk storage. Optionally, the memory may also be at least one storage device located away from the aforementioned processor.

The above processor may be a general-purpose processor, including a Central Processing Unit (CPU), a network processor (NP), or the like; or may be a Digital Signal Processing (DSP), an Application Specific Integrated Circuit (ASIC), a Field-Programmable Gate Array (FPGA) or other programmable logic devices, discrete gates or transistor logic devices, discrete hardware components.

Corresponding to the foregoing method embodiments, an embodiment of the present application further provides a computer readable storage medium. The computer readable storage medium stores a computer program. The computer program, when executed by the processor, implements any one of the methods for displaying a picture provided by the embodiments of the present application. The method for displaying a picture may include:

obtaining n columns of containers, wherein n is a preset number of columns of containers, and original widths of containers in any one of the n columns of containers are equal;

obtaining a height of each column of containers, and taking a maximum value of the obtained heights as a first height;

for each target column of containers, determining a height increment of each container in the target column of containers according to a difference between a height of the target column of containers and the first height, and adjusting an ordinate of each container and a height of each container in the target column of containers according to the height increment of each container in the target column of containers, wherein the target column of containers is each column of containers in the n columns of containers other than a column of containers with the first height;

for each column of containers, adjusting a width of each container in the column of containers according to a second height, a ratio of a height of the column of containers to the second height, a preset container gap, the number n of columns, and a width of a display interface, wherein the second height is a sum of the heights of the n columns of containers;

adjusting abscissas of containers in each column of containers according to the preset container gap and the adjusted widths of containers in the columns of containers; and displaying a corresponding picture in each container after the height, width, abscissa, and ordinate are adjusted.

In the present application, each column of containers in the n columns of containers with unequal heights is adjusted to a first height, such that the heights of the columns of containers are equal. In this way, the regularity of the arrangement of the n columns of containers is higher than that of the arrangement of containers in prior art, which allows pictures to be displayed more regularly, thereby producing the beautiful display effect of the pictures.

In an implementation, for each target column of containers, determining a height increment of each container in the target column of containers according to a difference between a height of the target column of containers and the first height comprises:

determining a height increment Δy of each container in each target column of containers according to the following formula:

$$\Delta y = \frac{\Delta h}{m},$$

wherein, Δh is a difference between a height of a target column of containers and the first height, and m is the number of containers in the target column of containers.

In an implementation, adjusting an ordinate of each container in the target column of containers according to the height increment of each container in the target column of containers comprises:

adjusting an ordinate of each target container in the column of containers according to the following formula:

y'=y+(p−1) Δy, wherein, y' is an adjusted ordinate of a target container, y is an ordinate of the target container before adjustment, Δy is a height increment of the target container, and p is a sequence number of the target container, in order from top to bottom, in a column of containers in which the target container is located.

In an implementation, for each column of containers, adjusting a width of each container in the column of containers according to a second height, a ratio of a height of the column of containers to the second height, a preset container gap, the number n of columns, and a width of a display interface comprises:

adjusting a width of each container in each column of containers according to the following formula:

$$w = \left(1 - \frac{h}{h_a}\right) \times [W - (n-1)s],$$

wherein, w is an adjusted width of a container, h is a height of a column of containers in which the container is located, $h_a$ is the second height, W is the width of the display interface, and s is the preset container gap.

In an implementation, adjusting abscissas of containers in each column of containers according to the preset container gap and the adjusted widths of containers in the columns of containers comprises:

adjusting an abscissa of each container according to the following formula:

$$x = (i-1)s + \sum_{c=1}^{i-1} w_c,$$

wherein, x is an adjusted abscissa of a container, i is a target sequence number of a column of containers in which the container is located, in order from left to right, in the n columns of containers, and $w_c$ is a width of a container in a column of containers with a sequence number c.

In an implementation, displaying a corresponding picture in each container after the height, width, abscissa, and ordinate are adjusted comprises:

adjusting a picture corresponding to each container and displaying the adjusted picture in the container by operations of:

calculating an adjusted height of a target picture corresponding to a reference container according to a height of the target picture and a first scaling ratio, wherein the first scaling ratio is a ratio of a width of the target picture to a width of the reference container, and the reference container is any container;

determining whether the adjusted height is greater than the height of the reference container;

if the adjusted height is greater than the height of the reference container, adjusting the width of the target picture to the width of the reference container, adjusting a height of the target picture to the adjusted height, and displaying the adjusted target picture in the reference container;

if the adjusted height is not greater than the height of the reference container, adjusting the height of the target picture to the height of the reference container, calculating an adjusted width of the target picture according to the width of the target picture and a second scaling ratio, adjusting the width of the target picture to the adjusted width and displaying the adjusted target picture in the reference container, wherein the second scaling ratio is a ratio of the height of the target picture to the height of the reference container.

In an implementation, after obtaining the height of each column of containers, the method further comprises:

determining whether the heights of the n columns of containers fluctuate within a preset range, and if the heights of the n columns of containers fluctuate within the preset range, performing the step of taking a maximum value of the obtained heights as a first height.

Corresponding to the above method embodiments, an embodiment of the present application further provides a computer program. The computer program implements any one of the methods for displaying a picture provided by the embodiments of the present application when being executed by a processor. The method for displaying a picture may include:

obtaining n columns of containers, wherein n is a preset number of columns of containers, and original widths of containers in any one of the n columns of containers are equal;

obtaining a height of each column of containers, and taking a maximum value of the obtained heights as a first height;

for each target column of containers, determining a height increment of each container in the target column of containers according to a difference between a height of the target column of containers and the first height, and adjusting an ordinate of each container and a height of each container in the target column of containers according to the height increment of each container in the target column of containers, wherein the target column of containers is each column of containers in the n columns of containers other than a column of containers with the first height;

for each column of containers, adjusting a width of each container in the column of containers according to a second height, a ratio of a height of the column of containers to the second height, a preset container gap, the number n of columns, and a width of a display interface, wherein the second height is a sum of the heights of the n columns of containers;

adjusting abscissas of containers in each column of containers according to the preset container gap and the adjusted widths of containers in the columns of containers; and displaying a corresponding picture in each container after the height, width, abscissa, and ordinate are adjusted.

In the present application, each column of containers in the n columns of containers with unequal heights is adjusted to a first height, such that the heights of the columns of containers are equal. In this way, the regularity of the arrangement of the n columns of containers is higher than that of the arrangement of containers in prior art, which allows pictures to be displayed more regularly, thereby producing the beautiful display effect of the pictures.

In an implementation, for each target column of containers, determining a height increment of each container in the target column of containers according to a difference between a height of the target column of containers and the first height comprises:

determining a height increment Δy of each container in each target column of containers according to the following formula:

$$\Delta y = \frac{\Delta h}{m},$$

wherein, Δh is a difference between a height of a target column of containers and the first height, and m is the number of containers in the target column of containers.

In an implementation, adjusting an ordinate of each container in the target column of containers according to the height increment of each container in the target column of containers comprises:

adjusting an ordinate of each target container in the column of containers according to the following formula:

y'=y+(p−1) Δy, wherein, y' is an adjusted ordinate of a target container, y is an ordinate of the target container before adjustment, Δy is a height increment of the target container, and p is a sequence number of the target container, in order from top to bottom, in a column of containers in which the target container is located.

In an implementation, for each column of containers, adjusting a width of each container in the column of containers according to a second height, a ratio of a height of the column of containers to the second height, a preset container gap, the number n of columns, and a width of a display interface comprises:

adjusting a width of each container in each column of containers according to the following formula:

$$w = \left(1 - \frac{h}{h_a}\right) \times [W - (n-1)s],$$

wherein, w is an adjusted width of a container, h is a height of a column of containers in which the container is located, $h_a$ is the second height, W is the width of the display interface, and s is the preset container gap.

In an implementation, adjusting abscissas of containers in each column of containers according to the preset container gap and the adjusted widths of containers in the columns of containers comprises:

adjusting an abscissa of each container according to the following formula:

$$x = (i-1)s + \sum_{c=1}^{i-1} w_c,$$

wherein, x is an adjusted abscissa of a container, i is a target sequence number of a column of containers in which the container is located, in order from left to right, in the n columns of containers, and $w_c$ is a width of a container in a column of containers with a sequence number c.

In an implementation, displaying a corresponding picture in each container after the height, width, abscissa, and ordinate are adjusted comprises:

adjusting a picture corresponding to each container and displaying the adjusted picture in the container by operations of:

calculating an adjusted height of a target picture corresponding to a reference container according to a height of the target picture and a first scaling ratio, wherein the first scaling ratio is a ratio of a width of the target picture to a width of the reference container, and the reference container is any container;

determining whether the adjusted height is greater than the height of the reference container;

if the adjusted height is greater than the height of the reference container, adjusting the width of the target picture to the width of the reference container, adjusting a height of the target picture to the adjusted height, and displaying the adjusted target picture in the reference container;

if the adjusted height is not greater than the height of the reference container, adjusting the height of the target picture to the height of the reference container, calculating an adjusted width of the target picture according to the width of the target picture and a second scaling ratio, adjusting the width of the target picture to the adjusted width and displaying the adjusted target picture in the reference container, wherein the second scaling ratio is a ratio of the height of the target picture to the height of the reference container.

In an implementation, after obtaining the height of each column of containers, the method further comprises:

determining whether the heights of the n columns of containers fluctuate within a preset range, and if the heights of the n columns of containers fluctuate within the preset range, performing the step of taking a maximum value of the obtained heights as a first height.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise (s) a/an . . . " and "include(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the apparatus is described briefly, since it is substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method performed by an electronic device for displaying a picture, characterized in that the electronic device comprising a processor, the processor executing the steps of:

obtaining n columns of containers, wherein n is a preset number of columns of containers, and original widths of containers in any one of the n columns of containers are equal;

obtaining a height of each column of containers, and taking a maximum value of the obtained heights as a first height;

for each target column of containers, determining a height increment of each container in the target column of containers according to a difference between a height of the target column of containers and the first height, and adjusting an ordinate of each container and a height of each container in the target column of containers according to the height increment of each container in the target column of containers, wherein the target column of containers is each column of containers in the n columns of containers other than a column of containers with the first height;

for each column of containers, adjusting a width of each container in the column of containers according to a second height, a ratio of a height of the column of containers to the second height, a preset container gap, the number n of columns, and a width of a display interface, wherein the second height is a sum of the heights of the n columns of containers;

adjusting abscissas of containers in each column of containers according to the preset container gap and the adjusted widths of containers in the columns of containers; and displaying a corresponding picture in each container after the height, width, abscissa, and ordinate are adjusted;

wherein for each target column of containers, determining a height increment of each container in the target column of containers according to a difference between a height of the target column of containers and the first height comprises:

determining a height increment $\Delta y$ of each container in each target column of containers according to the following formula:

$$\Delta y = \frac{\Delta h}{m},$$

wherein, $\Delta h$ is a difference between a height of a target column of containers and the first height, and m is the number of containers in the target column of containers;

wherein adjusting an ordinate of each container in the target column of containers according to the height increment of each container in the target column of containers comprises:

adjusting an ordinate of each target container in the column of containers according to the following formula:

$y'=y+(p-1)\Delta y$, wherein, y' is an adjusted ordinate of a target container, y is an ordinate of the target container before adjustment, $\Delta y$ is a height increment of the target container, and p is a sequence number of the target container, in order from top to bottom, in a column of containers in which the target container is located.

2. The method according to claim 1, wherein for each column of containers, adjusting a width of each container in the column of containers according to a second height, a ratio of a height of the column of containers to the second height, a preset container gap, the number n of columns, and a width of a display interface comprises:

adjusting a width of each container in each column of containers according to the following formula:

$$w = \left(1 - \frac{h}{h_a}\right) \times [W - (n-1)s],$$

wherein, w is an adjusted width of a container, h is a height of a column of containers in which the container is located, $h_a$ is the second height, W is the width of the display interface, and s is the preset container gap.

3. The method according to claim 2, wherein adjusting abscissas of containers in each column of containers according to the preset container gap and the adjusted widths of containers in the columns of containers comprises:

adjusting an abscissa of each container according to the following formula:

$$x = (i-1)s + \sum_{c=1}^{i-1} w_c,$$

wherein, x is an adjusted abscissa of a container, i is a target sequence number of a column of containers in which the container is located, in order from left to right, in the n columns of containers, and $w_c$ is a width of a container in a column of containers with a sequence number c.

4. The method according to claim 3, wherein displaying a corresponding picture in each container after the height, width, abscissa, and ordinate are adjusted comprises:

adjusting a picture corresponding to each container and displaying the adjusted picture in the container by operations of:

calculating an adjusted height of a target picture corresponding to a reference container according to a height of the target picture and a first scaling ratio, wherein the first scaling ratio is a ratio of a width of the target picture to a width of the reference container, and the reference container is any container;

determining whether the adjusted height is greater than the height of the reference container;

if the adjusted height is greater than the height of the reference container, adjusting the width of the target picture to the width of the reference container, adjusting a height of the target picture to the adjusted height, and displaying the adjusted target picture in the reference container;

if the adjusted height is not greater than the height of the reference container, adjusting the height of the target picture to the height of the reference container, calculating an adjusted width of the target picture according to the width of the target picture and a second scaling ratio, adjusting the width of the target picture to the adjusted width and displaying the adjusted target picture in the reference container, wherein the second scaling ratio is a ratio of the height of the target picture to the height of the reference container.

5. The method according to claim 1, wherein, after obtaining the height of each column of containers, the method further comprises:

determining whether the heights of the n columns of containers fluctuate within a preset range, and if the heights of the n columns of containers fluctuate within the preset range, performing the step of taking a maximum value of the obtained heights as a first height.

6. A non-transitory computer readable storage medium, wherein the computer readable storage medium stores a computer program, and the computer program, when executed by a processor, implements the method for displaying a picture according to claim 1.

7. An electronic device, comprising a processor, a communication interface, a memory, and a communication bus, wherein the processor, the communication interface, and the memory communicate with each other through the communication bus,
- wherein a plurality of executable modules including a first obtaining module, a second obtaining module, a first adjusting module, a second adjusting module, a third adjusting module and a display module are stored in the memory, which are executable by the processor to display a picture; wherein,
- the first obtaining module is executed to obtain n columns of containers, wherein n is a preset number of columns of containers, and original widths of containers in any one of the n columns of containers are equal;
- a second obtaining module is executed to obtain a height of each column of containers, and take a maximum value of the obtained heights as a first height;
- a first adjusting module is executed to determine, for each target column of containers, a height increment of each container in the target column of containers according to a difference between a height of the target column of containers and the first height, and adjust an ordinate of each container and a height of each container in the target column of containers according to the height increment of each container in the target column of containers, wherein the target column of containers is each column of containers in the n columns of containers other than a column of containers with the first height;
- the second adjusting module is executed to adjust, for each column of containers, a width of each container in the column of containers according to a second height, a ratio of a height of the column of containers to the second height, a preset container gap, the number n of columns, and a width of a display interface, wherein the second height is a sum of the heights of the n columns of containers;
- the third adjusting module is executed to adjust abscissas of containers in each column of containers according to the preset container gap and the adjusted widths of containers in the columns of containers; and
- the display module is executed to display a corresponding picture in each container after the height, width, abscissa, and ordinate are adjusted;
- wherein the first adjusting module is further executed to:
- determine the height increment $\Delta y$ of each container in each target column of containers according to the following formula:

$$\Delta y = \frac{\Delta h}{m},$$

wherein, $\Delta h$ is a difference between a height of a target column of containers and the first height, and m is the number of containers in the target column of containers;
- wherein the first adjusting module is further executed to:
- adjust an ordinate of each target container in the column of containers according to the following formula:
- $y'=y+(p-1) \Delta y$, wherein, y' is an adjusted ordinate of a target container, y is an ordinate of the target container before adjustment, $\Delta y$ is a height increment of the target container, and p is a sequence number of the target container, in order from top to bottom, in a column of containers in which the target container is located.

8. The electronic device according to claim 7, wherein the second adjusting module is further executed to:
- adjust a width of each container in each column of containers according to the following formula:

$$w = \left(1 - \frac{h}{h_a}\right) \times [W - (n-1)s],$$

wherein, w is an adjusted width of a container, h is a height of a column of containers in which the container is located, $h_a$ is the second height, W is the width of the display interface, and s is the preset container gap.

9. The electronic device according to claim 8, wherein the third adjusting module is further executed to:
- adjust an abscissa of each container according to the following formula:

$$x = (i-1)s + \sum_{c=1}^{i-1} w_c,$$

wherein, x is an adjusted abscissa of a container, i is a target sequence number of a column of containers in which the container is located, in order from left to right, in the n columns of containers, and $w_c$ is a width of a container in a column of containers with a sequence number c.

10. The electronic device according to claim 9, wherein the display module comprises: a calculating submodule, a determining submodule, a first adjusting submodule, and a second adjusting submodule, which are executable by the processor to display a picture;
- the display module is further executed to adjust, by the calculating submodule, the determining submodule, the first adjusting submodule and the second adjusting submodule, a picture corresponding to each container, and display the adjusted picture in the container;
- the calculating submodule is executed to calculate an adjusted height of a target picture corresponding to a reference container according to a height of the target picture and a first scaling ratio, wherein the first scaling ratio is a ratio of a width of the target picture to a width of the reference container, and the reference container is any container;
- the determining submodule is executed to determine whether the adjusted height is greater than the height of the reference container; if the adjusted height is greater than the height of the reference container, trigger the first adjusting submodule; if the adjusted height is not greater than the height of the reference container, trigger the second adjusting submodule;

the first adjusting submodule is executed to adjust the width of the target picture to the width of the reference container, adjust a height of the target picture to the adjusted height, and display the adjusted target picture in the reference container; and the second adjusting submodule is executed to adjust the height of the target picture to the height of the reference container, calculate an adjusted width of the target picture according to the width of the target picture and a second scaling ratio, adjust the width of the target picture to the adjusted width and display the adjusted target picture in the reference container, wherein the second scaling ratio is a ratio of the height of the target picture to the height of the reference container.

11. The electronic device according to claim 7, wherein a determination module is also stored in the memory, which is executable by the processor to determine whether the heights of the n columns of containers fluctuate within a preset range, and if the heights of the n columns of containers fluctuate within the preset range, trigger the second obtaining module.

* * * * *